United States Patent

[11] 3,633,532

[72] Inventor Peter Bruce
  10 Torphichen Place, Edinburgh, EH3.
  8DU, Scotland
[21] Appl. No. 51,095
[22] Filed June 30, 1970
[45] Patented Jan. 11, 1972

[54] TUG LINKAGE
  11 Claims, 4 Drawing Figs.
[52] U.S. Cl. ................................................. 114/235 R
[51] Int. Cl. ....................................................... B63b 21/00
[50] Field of Search ........................................... 114/235 R,
  77 R, 230

[56] References Cited
UNITED STATES PATENTS
3,322,091  5/1967  Stanwick .................. 114/235 R
FOREIGN PATENTS
1,202,675  10/1965  Germany .................. 114/235 R

*Primary Examiner*—Trygve M. Blix

ABSTRACT: A coupling for connecting two vessels comprising a recessed concave member on one vessel and a protuberant convex member on the other vessel, said members being sealably fittable together to enclose an intervening space wherein the content pressure may be reduced by pumping to allow external atmospheric and hydrostatic pressures to establish a compressive force to hold the two vessels linked rigidly together for all conditions at sea.

Peter Bruce

TUG LINKAGE

The present invention relates to a coupling for joining vessels rigidly together.

The term "tugboat" is used hereinafter to include the term "pushboat" and vice versa.

Hitherto, barges have been generally connected to tugboats by towlines whereby the barges have been pulled through the water by the tugboats although instances of pushing arrangements have been proposed from time to time in the past.

With a pushing arrangement, the efficiency loss of towing caused by wave motion tautening and slackening a towline is avoided but difficulties arise in coupling a pushboat to a barge such that the forces tending to cause relative motion between the vessels are safely accommodated. Coupling methods used in the past have included fixed and movable pin joints giving rigid or hinged couplings. However, in the case of hinged couplings, the strength of the joints has generally proven to be inadequate and, in the case of rigid couplings, the operational difficulties of mating the vessels together have proven to be a substantial disadvantage due to the complexity of the joining members.

It is an object of the present invention to provide a coupling between two vessels whereby the vessels are connected rigidly together such that all relative motion between the two vessels is eliminated to permit the vessels to act effectively as a single rigid composite vessel for all conditions at sea.

The presently described rigid coupling has the advantage of low stressing of the load-bearing surfaces; high overall clamping-together force; actuation by simple low-pressure fluid pumps; rapid disengagement capability in emergencies; and extreme constructional simplicity.

According to the present invention a coupling between two vessels comprises: a structure bearing a concave recessed surface mounted on an extremity of a first vessel and a structure bearing a convex protuberant surface mounted on an extremity of a second vessel such that the convex surface is engageable into the concave surface to enclose an intervening space; load-bearing mating areas included on each of the structures; and sealing means mounted on at least one of the structures whereby the intervening space enclosed by the surfaces when engaged together may be substantially sealed off; and pumping means mounted on at least one vessel and connecting with the intervening space, enclosed by the surfaces when engaged together, whereby content pressure within the intervening space may be reduced to permit external pressures to exert a compressive force on the linked vessels tending to maintain the surfaces in engagement and the load-bearing mating areas in rigid contact together.

Preferably the concave recessed and convex protuberant surfaces are right circular truncated conical surfaces capable of nesting together.

Preferably the load-bearing mating areas, when in contact, are located within the engaged coupling such that any pivoting tendency of the convex protuberant surface about any part of the rim of the concave recessed surface causes increased contact pressure to arise in a portion of the load-bearing areas.

Preferably, where the concave recessed and convex protuberant surfaces are right circular truncated conical surfaces, the load-bearing mating areas in contact within the engaged coupling extend outside an imaginary spherical surface-of-revolution of the circular rim of the concave recessed surface such that any pivoting tendency of the convex protuberant surface about any part of the rim of the concave recessed surface causes increased contact pressure to arise in those portions of the load-bearing mating areas which lie outside of the imaginary spherical surface-of-revolution and furthest away from the pivot point on the rim of the concave recessed surface.

Preferably the sealing means comprises at least one inflatable flexible-membrane toroidal ring mounted on and around the convex protuberant surface and engageable with the concave recessed surface, and pumping means connected thereto whereby fluid may be pumped into the toroidal ring during engagement of the coupling to cause the ring to expand between the concave and convex surfaces to form a substantially fluid-tight seal for the intervening space within the engaged coupling.

Preferably the load-bearing mating areas are located between the sealing means and the intervening space within the engaged coupling.

An embodiment of the present invention will now be described by way of example with reference to the accompanying drawings in which.

Figure 1:
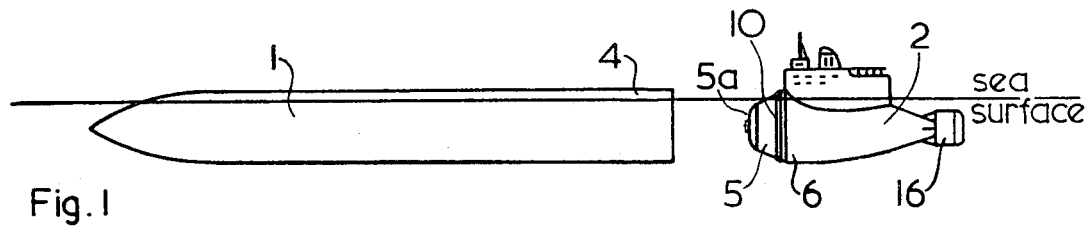
FIG. 1 shows a side elevation of a barge and pushboat equipped with a coupling according to an embodiment of the present invention, the coupling being in the disengaged state.
Figure 2:
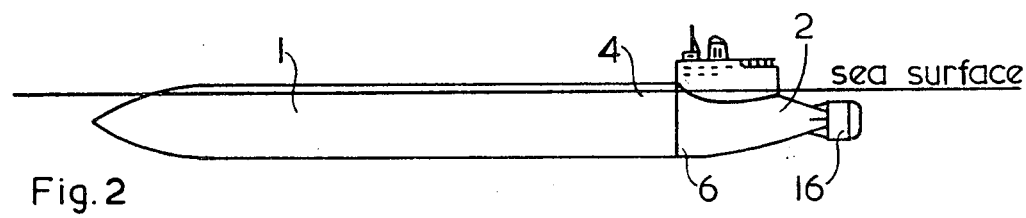
FIG. 2 shows a side elevation of the barge and pushboat of FIG. 1, but with the coupling engaged.
Figure 3:
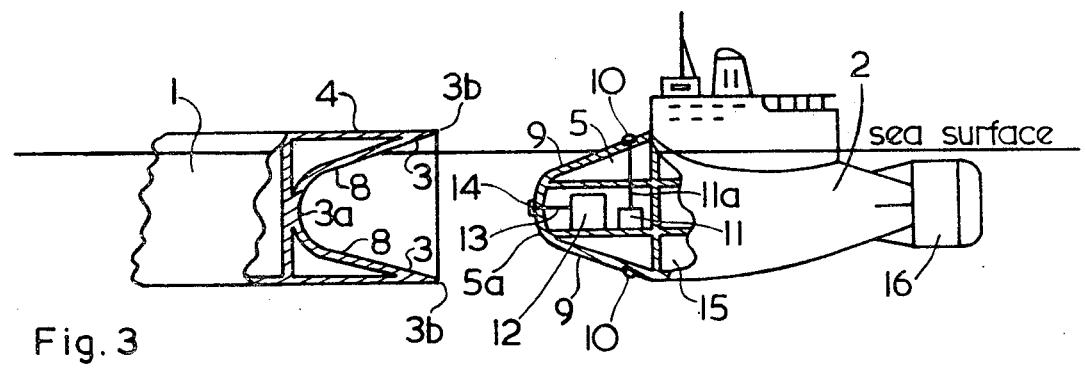
FIG. 3 shows an enlarged and sectioned side elevation of the disengaged vessels of FIG. 1.
Figure 4:
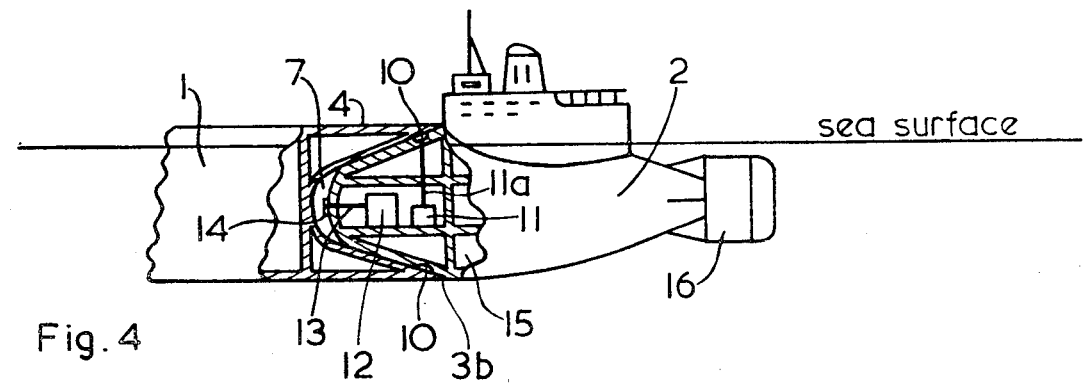
FIG. 4 shows an enlarged and sectioned side elevation of the engaged vessels of FIG. 2.

Referring to FIGS. 1, 2, 3, and 4, in one embodiment of the present invention, a coupling for connecting a barge 1 rigidly to a pushboat 2 comprises a truncated circular conical concave recessed surface 3 mounted at a rear extremity 4 of the barge 1 and a truncated circular conical convex protuberant surface 5 mounted at a foremost extremity 6 of the pushboat 2 such that the convex surface 5 is fittable into the concave surface 3 to enclose an evacuable intervening space 7 between the truncation surfaces 3a, 5a and engage load-bearing mating areas 8, 9, located on each of the two conical surfaces 3, 5, in firm contact together.

When the convex surface 5 is fitted into the concave surface 3, part of the mating area 9 of the convex protuberance 5 extends outside an imaginary spherical surface-of-revolution of the circular rim 3b of the concave surface 3 such that any pivoting tendency of the convex surface 5 about any part of the rim 3b causes increased contact pressure to arise in those portions of the load-bearing mating areas 8, 9 lying outside of the imaginary spherical surface-of-revolution and furthest away from the pivot point on the rim 3b of the concave surface 3.

An inflatable flexible-membrane toroidal ring 10 is located around the base of the truncated conical convex protuberant surface 5 on the pushboat 2 which can engage with the recessed conical concave surface of the barge 1 to form a fluid seal for the engaged coupling. The toroidal ring 10 is inflatable by pumps 11 mounted within the pushboat 2 which are connected to the toroidal ring by pipes 11a.

The load-bearing mating areas 8, 9 of the convex and concave surfaces 3, 5 of the coupling are located between the inflatable flexible-membrane toroidal ring 10 and the evacuable intervening space 7 formed within the coupling when the coupling surfaces 3, 5 are engaged together. The evacuable intervening space 7 within the coupling is evacuable by pumps 12 located within the pushboat 2 and connected to the truncation surface 5a of the conical protuberant surface 5 by pipes 13 and valves 14.

The pushboat 2 is equipped with variable ballast tanks 15 whereby the pushboat draught may be varied to permit alignment of the conical surfaces 3, 5 of the coupling prior to final engagement of the vessels 1, 2 together.

In use, the pushboat 2 is brought up to the recess 3 at the rear of the barge 1 and the contents of the ballast tanks 15 are varied to alter the draught of the pushboat 2 to permit alignment of the axis of the recess 3 on the barge 1 with the axis of the conical protuberance 5 on the pushboat 2. The pushboat 2 is then set in motion very slowly so that its convex protuberant surface 5 enters and engages with the concave surface 3 at the rear extremity of the barge. With the propeller within the Kort nozzle 16 of the pushboat 2 turning slowly to maintain a small contact pressure between the two vessels 1, 2, pumps 11 within the pushboat 2 are set in motion to inflate with water or air the flexible-membrane toroidal ring 10 through pipes 11a to cause the toroidal ring 10 to expand and press against the conical concave surface of the barge recess 3 and so seal off the intervening space 7 within the coupling while, simultaneously, pumps 12 within the pushboat 2 are operated to partially evacuate, via pipes 13 and valves 14, the enclosed and now sealed intervening space 7 within the coupling. As the pressure in the enclosed sealed intervening space 7 within the engaged coupling falls under the action of the evacuating pumps 12, a large compressive force is established which firmly presses together the load-bearing mating surfaces 8, 9 of the conical surfaces 3, 5 within the engaged coupling. When the evacuation of the sealed intervening space 7 has proceeded sufficiently to establish a suitable low pressure well below atmospheric pressure, the engagement of the coupling is complete and the two vessels 1, 2 are rigidly connected together by the action of external atmospheric and hydrostatic pressures so that the two vessels act effectively as a single rigid composite vessel for all conditions at sea.

Subsequent disengagement of the coupling to separate the two linked vessels in normal use, or in emergency, can be performed very quickly by venting external water into the sealed intervening space 7 and reversing the main propeller of the pushboat 2 or by reversing the evacuation pumps 12 to pressurize the intervening space 7, in order to force the coupling apart.

Whereas the present invention is applicable to marine vessels, it will be understood that it also embraces application to vessels for use in nonmarine environments.

Reference is made to the accompanying drawings by way of example only.

I claim

1. A coupling between two vessels comprising: a structure bearing a concave recessed surface mounted on an extremity of a first vessel and a structure bearing a convex protuberant surface mounted on an extremity of a second vessel such that said convex surface is engageable into said concave surface to enclose an intervening space; load-bearing mating areas included on each of said structures; and sealing means mounted on at least one of said structures whereby said intervening space enclosed by said surfaces when engaged together may be substantially sealed off; and pumping means mounted on at least one vessel and connecting with said intervening space, enclosed by said surfaces when engaged, whereby content pressure within said intervening space may be reduced to permit external pressures to exert a compressive force tending to maintain said surfaces in engagement and said load-bearing mating areas in rigid contact together.

2. A coupling as claimed in claim 1, wherein said concave surface and said convex surface are right circular truncated conical surfaces capable of nesting together.

3. A coupling as claimed in claim 1, wherein said load-bearing mating areas in contact are located within the engaged coupling such that any pivoting tendency of said convex surface about any part of the rim of said concave surface causes contact pressure to increase in a portion of said load-bearing mating areas.

4. A coupling as claimed in claim 2, wherein said load-bearing mating areas in contact within the engaged coupling extend outside an imaginary spherical surface-of-revolution of the circular rim of said concave recessed surface such that any pivoting tendency of said convex surface about any part of said rim of said concave surface causes contact pressure to increase in those portions of said load-bearing mating areas which lie outside of said imaginary spherical surface and furthest away from the pivot point on said rim of said concave recessed surface.

5. A coupling as claimed in claim 1, wherein said sealing means comprises at least one inflatable flexible-membrane toroidal ring mounted on and around said convex surface and engageable with said concave surface and pumping means connected thereto whereby fluid may be pumped into said toroidal ring during engagement of said coupling to cause said toroidal ring to expand between said surfaces and form a substantially fluidtight seal for said intervening space within said engaged coupling.

6. A coupling as claimed in claim 2, wherein said sealing means comprises at least one inflatable flexible-membrane toroidal ring mounted on and around said convex surface and engageable with said concave surface and pumping means connected thereto whereby fluid may be pumped into said toroidal ring during engagement of said coupling to cause said toroidal ring to expand between said surfaces and form a substantially fluidtight seal for said intervening space within said engaged coupling 7. A coupling as claimed in claim 3, wherein said sealing means comprises at least one inflatable flexible-membrane toroidal ring mounted on and around said convex surface and engageable with concave surface and pumping means connected thereto whereby fluid may be pumped into said toroidal ring during engagement of said coupling to cause said toroidal ring to expand between said surfaces and form a substantially fluidtight seal for said intervening space within said engaged coupling.

8. A coupling as claimed in claim 4, wherein said sealing means comprises at least one inflatable flexible-membrane toroidal ring mounted on and around said convex surface and engageable with said concave surface and pumping means connected thereto whereby fluid may be pumped into said toroidal ring during engagement of said coupling to cause said toroidal ring to expand between said surfaces and form a substantially fluidtight seal for said intervening space within said engaged coupling.

9. A coupling as claimed in claim 2, wherein said load-bearing mating areas are located between said sealing means and said intervening space when said coupling is engaged.

10. A coupling as claimed in claim 6, wherein said load-bearing mating areas are located between said sealing means and said intervening space when said coupling is engaged.

11. A coupling as claimed in claim 8, wherein said load-bearing mating areas are located between said sealing means and said intervening space when said coupling is engaged.

* * * * *